Jan. 22, 1963     KEIZO YAMAJI     3,074,318

ZOOM LENS SYSTEM

Filed Sept. 2, 1960

SPHERICAL ABERRATION AND DEVIATION FROM SINE CONDITION

ASTIGMATISM

INVENTOR.
KEIZO YAMAJI
BY
ATTORNEY

United States Patent Office 3,074,318
Patented Jan. 22, 1963

3,074,318
ZOOM LENS SYSTEM
Keizo Yamaji, Tokyo, Japan, assignor to Canon Camera Co., Inc., a corporation
Filed Sept. 2, 1960, Ser. No. 53,813
Claims priority, application Japan Sept. 5, 1959
4 Claims. (Cl. 88—57)

The present invention relates to a zoom lens system that has successfully been worked for uniform and high degree correction of spherical aberration, sine condition deviation and astigmatism, throughout the entire range of zooming and is applicable to cameras for taking photographic and television pictures.

Initial development of zoom lenses had as its object the attainment of the so-called zooming effect, which is an effect producing the impression that the viewed scene approaches or recedes from the viewer, for example, rapidly. Consequently, improvement of zoom lenses is directed to the use of this effect in the motion picture technique. Should pictures, that had been taken with such lens, indeed at both extreme points in the range of zooming have tolerably satisfied this immediate aim, people would have made no special demands as to high degree of picture sharpness taken at other points except those taken with the zoom lens. With the zoom lens being popularized, however, a zoom lens having performances the equal of that of a lens of universal focal length came to be demanded so that in place of many exchangeable lenses having different focal lengths respectively being required, the array of lenses functions for all scenes as a single zoom lens system, and, moreover, results in full performances the same as a lens having a focal length corresponding to any point of the zooming range.

An object of the present invention is to provide a zoom lens system that can successfully function at uniform and high degree correction of spherical aberration, sine condition deviation and astigmatism through the entire range of zooming.

Another object of the present invention is to provide a zoom lens system that performs, as a unique lens system, the functions of a plurality of lenses of different focal lengths, i.e. as a lens of universal focal length.

Other objects, advantages and features of the present invention will become more apparent from the following description of an illustrative embodiment in conjunction with the drawing in which.

The improved zoom lens embodying the present invention comprises a set of four components I, II, III and IV.

The positive refraction component I consists of a cemented doublet highly convex to the "front," i.e. to the incident light, and a single positive meniscus element highly convex to the front and positioned close to the doublet.

The negative refraction component II consists of two planoconcave elements positioned parallel to each other and both highly concave to the rear, and of a cemented doublet highly concave to the front with its cemented surface highly convex to the front.

The component III consists of a single biconcave element highly concave to the front.

The fixed component IV is positioned to the rear of the third component and is for image formation.

Figure 1:
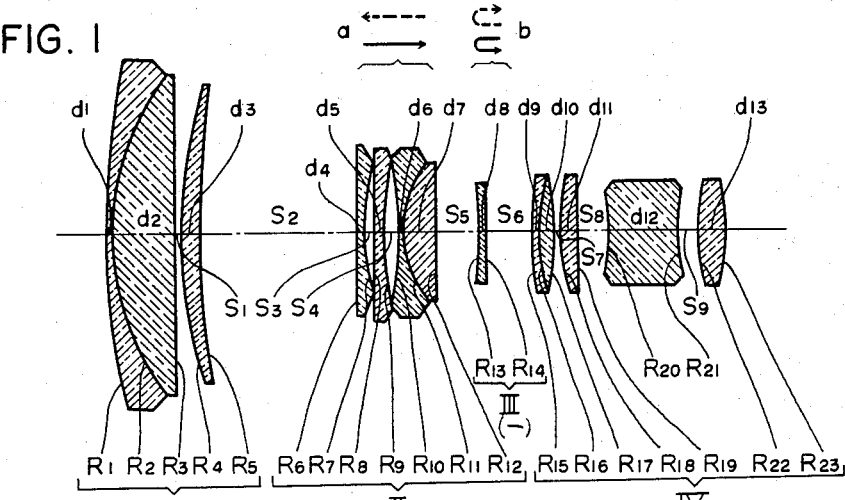
FIG. 1 is a sectional view of a zoom lens system illustrative of the present invention.

In zooming, component II may be longitudinally shifted either to the front or to the rear, as indicated in FIG. 1 by arrows $a$, respectively, simultaneously while the component III is moved in either direction to and fro, as indicated in FIG. 1 by U-shaped arrows $b$, respectively.

The reference characters, of which some are also used in FIG. 1 are as follows: I, II, III and IV indicate the first, second, third and fourth components respectively; $R_1, R_2 \ldots R_{23}$, the radii of curvature of the respective component elements, from the front to the rear in order; $N_1, N_2 \ldots N_{13}$, the refractive indices of the glasses of the respective component elements when measured for the $d$-line of the spectrum, in said order; $V_1, V_2 \ldots V_{13}$, the Abbe numbers for the glasses of the respective component elements, in said order; $d_1, d_2 \ldots d_{13}$, the axial thicknesses of the respective component elements, in said orders; and $s_1, s_2 \ldots s_9$, the air spacings between the components or elements, in said order.

With the zoom lens according to the present invention, the following numerical value conditions must be satisfied, where Z denotes the zooming ratio; $f_1$, $f_2$ and $f_3$ the focal lengths of components I, II and III, respectively; with the radii of curvature having positive signs when the lens surfaces are convex to the incident light:

| | | |
|---|---|---|
| $0.5f_1 < R_1 < 2f_1$ | $N_1 > 1.65$ | |
| $2f_1 < |R_3|$ | $N_2 > 1.65$ | $|V_1 - V_2| > 15$ |
| $0.5f_1 < R_4 < 1.5f_1$ | $N_3 > 1.6$ | $V_3 > 55$ |
| $1.5f_1 < R_5$ | | |
| $-5f_2 < |R_6|$ | $N_4, N_5 > 1.61$ | |
| $-f_2 < R_7 < -5f_2$ | | $V_4, V_5 > 50$ |
| $-5f_2 < |R_8|$ | | |
| $-f_2 < R_9 < -5f_2$ | | |
| $-f_2 < -R_{10} < -5f_2$ | $N_6, N_7 > 1.60$ | |
| $-0.3f_2 < R_{11} < -1.3f_2$ | | $V_6 55, V_7 < 37$ |
| $-5f_2 < |R_{12}|$ | | $V_6 - V_7 > 15$ |
| $0.5f_1 < -R_{13} < 1.7f_1$ | $N_8 > 1.55$ | |
| $1.6f_1 < R_{14} < 4f_1$ | | $V_8 > 50$ |
| $0.4\dfrac{1+\sqrt{Z}}{Z-1}f_1 < -f_3 < 1.5\dfrac{1+\sqrt{Z}}{Z-1}f_1$ | | | and $f_1 = 3.8$ (approximately), $f_2 = -1.1$ (approximately) for a zoom lens system having a minimum focal length $F_0 = 1$, and an $f$-value of the order from $f/2.5$ to $f/3$.

The design of a prior art zoom lens with aberrations corrected no further than for attaining what is called the zooming effect as mentioned above, is comparatively easy, but successful practice of the high degree aberration correction for the entire range of zooming is far from easy. The basic principles to be observed in carrying out such high degree aberration correction in designing zoom lenses are firstly, that in the front part of the zoom lens system, the zooming part including the movable component, should be made to have their proper residual aberrations stabilized and that they be maintained nearly constant in value all through the entire range of zooming; and, secondly, that the fixed component lying in the rear part of the lens, mainly the imaging part, should be made to remove said residual aberration. However, it is so difficult to maintain the stabilization of the residual aberration as required by the first condition that it is most important to concentrate on the resolution of such requirement.

The present inventor has now discovered that the residual aberration may be stabilized in the system lying in the front part of the lens array for zooming function when the spherical aberration of the axial and off-axial rays and the meridional curvature of the image field are left considerably undercorrected; that the aberrations at both extreme points in the zooming range may be balanced by suitably modifying the design of the first and the second components of the lens array; and that the possible difference in value of the residual aberrations at points other than at the two extremes of the zooming range from that at these points, may be corrected by the third component having properly selected refraction and design. The zooming system lying in the front part of the zoom lens according to the present invention has realized what has been discovered by the present inventor as stated above. The residual aberration there has been made to lie stabilized through the entire range of zooming, and the fixed component lying in the rear part of the zooming lens has been made to have the function of removing the residual aberration of the system lying in the front part of the zoom lens with its proper spherical aberration and meridional curvature of image field.

The illustrative example embodying the present invention shown in the following as FIG. 1, has the following numerical data:

[Aperture ratio: 1:2.8. Zooming ratio: 4.4444. Minimum focal length: $F_0=1$. Maximum focal length: $ZF_0=4.4444$. Available image field diameter: over 0.96]

| | | | |
|---|---|---|---|
| $R_1=4.6924$ | $d_1=0.0667$ | $N_1=1.6889$ | $V_1=31.1$ |
| $R_2=1.7478$ | $d_2=0.4444$ | $N_2=1.6935$ | $V_2=53.4$ |
| $R_3=\infty$ | $s_1=0.0022$ | | |
| $R_4=3.3395$ | $d_3=0.1556$ | $N_3=1.6204$ | $V_3=60.3$ |
| $R_5=9.0175$ | $s_2=\begin{cases}0.0097\\1.2155\\1.7875\end{cases}$ | | |
| $R_6=\infty$ | $d_4=0.0400$ | $N_4=1.6385$ | $V_4=55.5$ |
| $R_7=2.0666$ | $s_3=0.0751$ | | |
| $R_8=\infty$ | $d_5=0.0400$ | $N_5=1.6385$ | $V_5=55.5$ |
| $R_9=2.0666$ | $s_4=0.1316$ | | |
| $R_{10}=-2.0666$ | $d_6=0.0267$ | $N_6=1.6583$ | $V_6=57.3$ |
| $R_{11}=0.6651$ | $d_7=0.2289$ | $N_7=1.6477$ | $V_7=33.9$ |
| $R_{12}=-10.1419$ | $s_5=\begin{cases}1.8414\\0.3521\\0.0637\end{cases}$ | | |
| $R_{13}=-3.0782$ | $d_8=0.0444$ | $N_8=1.5688$ | $V_8=56.0$ |
| $R_{14}=9.6259$ | $s_6=\begin{cases}0.0889\\0.3724\\0.0889\end{cases}$ | | |
| $R_{15}=2.4029$ | $d_9=0.0222$ | $N_9=1.7283$ | $V_9=28.3$ |
| $R_{16}=0.9098$ | $d_{10}=0.1378$ | $N_{10}=1.6433$ | $V_{10}=47.8$ |
| $R_{17}=-2.4029$ | $s_7=0.0111$ | | |
| $R_{18}=0.9524$ | $d_{11}=0.1442$ | $N_{11}=1.6073$ | $V_{11}=59.5$ |
| $R_{19}=-13.4843$ | $s_8=0.2307$ | | |
| $R_{20}=-1.6858$ | $d_{12}=0.5509$ | $N_{12}=1.6477$ | $V_{12}=33.9$ |
| $R_{21}=0.7678$ | $s_9=0.1164$ | | |
| $R_{22}=1.3423$ | $d_{13}=0.2444$ | $N_{13}=1.6237$ | $V_{13}=47.0$ |
| $R_{23}=-1.3423$ | | | | and the focal lengths of components I, II and III are, respectively, $f_1=3.799$, $f_2=-1.088$ and $f_3=4.095$.

The air spacings $s_2$, $s_5$ and $s_6$ are variable corresponding to changes in the total focal length F, the minimum, the medium and the maximum, $s_2$, $s_5$ and $s_6$ are

| F=1 | 2.3876 | 4.4444 |
|---|---|---|
| $s_2=0.0097$ | 1.2155 | 1.7875 |
| $s_5=1.8414$ | 0.3521 | 0.0637 |
| $s_6=0.0889$ | 0.3724 | 0.0889 |

Figure 2:
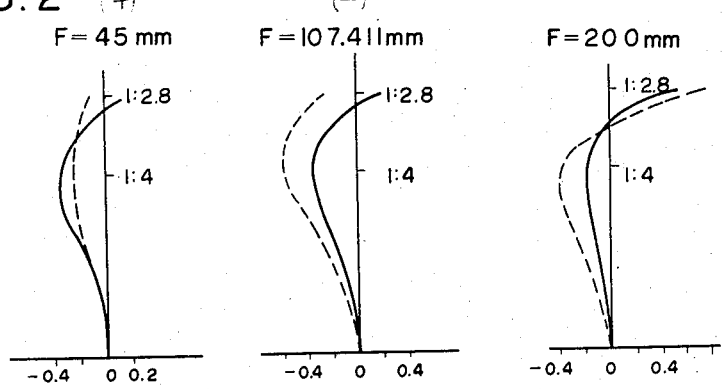
FIG. 2 shows the graphs of spherical aberration and sine condition deviation when the focal length is the minimum, the medium and the maximum of the illustrative zoom lens system embodying the present invention.
Figure 3:
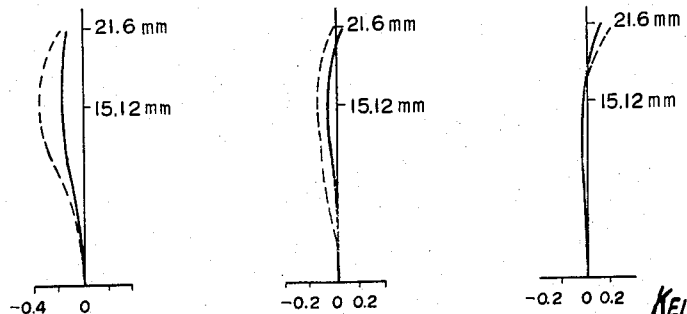
FIG. 3 shows the graphs of astigmatism recorded under the same conditions as mentioned for the graphs of FIG. 2.

In FIGS. 2 and 3 are shown in comparison the graphs of spherical aberration, sine condition deviation and astigmatism, when the focal length F is made to be the minimum 45 mm., the medium 107.441 mm. and the maximum 200 mm. In FIG. 2 the spherical aberration is shown in full line and sine condition deviation in chain line. In FIG. 3 the sagittal graphs are shown in full line and the meridional graps of astigmatism in chain line, and are indicative of excellent and stabilized aberration correction through the entire range of zooming.

It will be understood that the present invention is not limited to the specific materials, figures, etc., and other details described above and illustrated in the drawing, but can be carried out with various modifications without departing from the scope of the invention, as defined in the appended claims.

What is claimed is:

1. A zoom lens system comprising a first positive component consisting of a cemented doublet highly convex to the object side of the system and a single positive meniscus highly convex to the object side and positioned close to the doublet, a second negative component consisting of two single negative elements positioned parallel to each other and both highly concave to the image side of the system and a cemented doublet highly concave to the object side with its cemented surface highly convex to the object side, a third component consisting of a single biconcave element highly concave to the object side, and a fourth fixed component for image formation positioned to the rear of the third component; the second component being selectively movable in one direction to the object side and to the image side while the third component is moved reciprocatably when the magnification of the system is varied from one extreme value to the other extreme value within the zooming range; the system satisfying the following conditions:

| | | |
|---|---|---|
| $0.5f_1<R_1<2f_1$ | $N_1>1.65$ | $\|V_1-V_2\|>15$ |
| $2f_1<\|R_3\|$ | $N_2>1.65$ | |
| $0.5f_1<R_4<1.5f_1$ | $N_3>1.6$ | $V_3>55$ |
| $1.5f_1<R_5$ | | |
| $-5f_2<\|R_6\|$ | $N_4, N_5>1.61$ | $V_4, V_5>50$ |
| $-f_2<R_7<-5f_2$ | | |
| $-5f_2<\|R_8\|$ | | |
| $-f_2<R_9<-5f_2$ | | |
| $-f_2<-R_{10}<-5f_2$ | $N_6, N_7>1.60$ | |
| $-0.3f_2<R_{11}<-1.3f_2$ | | $V_6>55, V_7<37$ |
| $-5f_2<R_{12}$ | | |
| $0.5f_1<-R_{13}<1.7f_1$ | $N_8>1.55$ | $V_6-V_7>15$ |
| $1.6f_1<R_{14}<4f_1$ | | $V_8>50$ |
| $0.4\frac{1+\sqrt{Z}}{Z-1}f_1<-f_3<1.5\frac{1+\sqrt{Z}}{Z-1}f_1$ | | |

$f_1=3.8$ (approximately), and $f_2=-1.1$ (approximately) for the zoom lens system having a minimum focal length $F_0=1$, and having a relative aperture of the order of from $f/2.5$ to $f/3$, where $f_1$, $f_2$ and $f_3$ are the respective focal lengths of the first, the second and the third components, $R_{\text{subscript}}$ the radii of curvature of the respective surfaces from the object to the image side of the system in consecutive order, $N_{\text{subscript}}$ the refractive indices for the d-line of the spectrum of the glasses of the elements in such order, $V_{\text{subscript}}$ the Abbe numbers for the glasses of the respective elements in such order, and Z the zooming ratio.

2. A zoom lens system comprising a first positive component consisting of a cemented doublet highly convex to the object side of the system and a single positive meniscus element highly convex to the object side and positioned close to the doublet, a second negative component consisting of two single negative elements positioned parallel to each other and both highly concave to the image side of the system and a cemented doublet highly concave to the object side with its cemented surface highly convex to the object side, a third component consisting of a single biconcave element highly concave to the object side, and a fourth fixed component for image formation positioned beyond the third component; the second component being selectably movable in one direction to the object side and the image side while the third component is reciprocatably movable when the magnification of the system is varied from one extreme value to the other extreme value in the zooming range; the system satisfying the following conditions:

$$0.5f_1 < R_1 < 2f_1 \quad N_1 > 1.65$$
$$2f_1 < |R_3| \quad N_2 > 1.65 \quad |V_1 - V_2| > 15$$
$$0.5f_1 < R_4 < 1.5f_1 \quad N_3 > 1.6$$
$$1.5f_1 < R_5 \quad V_3 > 55$$
$$-5f_2 < |R_6| \quad N_4, N_5 > 1.61$$
$$-f_2 < R_7 > 5f_2 \quad V_4, V_5 > 50$$
$$-5f_2 < |R_9|$$
$$-f_2 < R_9 < -5f_2$$
$$-f_2 < -R_{10} < -5f_2 \quad N_6, N_7 > 1.60$$
$$-0.3f_2 < R_{11} < -1.3f_2 \quad V_6 > 55, V_7 < 37$$
$$-5f_2 < R_{12} \quad V_6 - V_7 > 15$$
$$0.5f_1 < -R_{13} < 1.7f_1 \quad N_8 > 1.55$$
$$1.6f_1 < R_{14} < 4f_1 \quad V_8 > 50$$
$$0.4\frac{1+\sqrt{Z}}{Z-1}f_1 < -f_3 < 1.5\frac{1+\sqrt{Z}}{Z-1}f_1$$

the approximate values of $f_1$ is 3.8 and that of $f_2$ is $-1.1$ for the zoom lens having a minimum focal length $F_0=1$, and having a relative aperture of the order of from $f/2.5$ to $f/3$, where $f_1$, $f_2$ and $f_3$ are the respective focal lengths of the first, second and third components, $R_{subscript}$ the radii of curvature of the surfaces from the object to the image side in successive order, $N_{subscript}$ the refractive indices of the glasses of the elements for the $d$-line of the spectrum in such order, $V_{subscript}$ the Abbe numbers for the glasses of the elements in such order, and $Z$ the zooming ratio.

3. A zoom lens system with its main zooming portion consisting of a first component I, a second component II and a third component III, of which the numerical data is as follows:

| Component | Radius of Curvature | Lens Thickness or Air Spacing | Index of Refraction | Abbe Number |
|---|---|---|---|---|
| I | $R_1 = 4.6924$ | | | |
| | $R_2 = 1.7478$ | $d_1 = 0.0667$ | $N_1 = 1.6889$ | $V_1 = 31.1$ |
| | $R_3 = \infty$ | $d_2 = 0.4444$ | $N_2 = 1.6935$ | $V_2 = 53.4$ |
| | $R_4 = 3.3395$ | $s_1 = 0.0022$ | | |
| | $R_5 = 9.0175$ | $d_3 = 0.1556$ | $N_3 = 1.6204$ | $V_3 = 60.3$ |
| | | $s_2 = \begin{cases}0.0097\\1.2155\\1.7875\end{cases}$ | | |
| II | $R_6 = \infty$ | $d_4 = 0.0400$ | $N_4 = 1.6385$ | $V_4 = 55.4$ |
| | $R_7 = 2.0666$ | $s_3 = 0.0751$ | | |
| | $R_8 = \infty$ | $d_5 = 0.0400$ | $N_5 = 1.6385$ | $V_5 = 55.5$ |
| | $R_9 = 2.0666$ | $s_4 = 0.1316$ | | |
| | $R_{10} = -2.0666$ | $d_6 = 0.0267$ | $N_6 = 1.6583$ | $V_6 = 57.3$ |
| | $R_{11} = 0.6651$ | $d_7 = 0.2289$ | $N_7 = 1.6477$ | $V_7 = 33.9$ |
| | $R_{12} = -10.1419$ | | | |
| | | $s_5 = \begin{cases}1.9414\\0.3521\\0.0637\end{cases}$ | | |
| III | $R_{13} = -3.0782$ | $d_8 = 0.0444$ | $N_8 = 1.5788$ | $V_8 = 56.0$ |
| | $R_{14} = 0.6259$ | | | | the focal length $f_1$ of the first component I is 3.7987, the focal length $f_2$ of the second component II is $-1.0880$, the focal length $f_3$ of the third component III is $-4.0953$, the reciprocal value of each $R_{subscript}$ varying by a maximum of $\pm 0.05$, each value of $d_{subscript}$, $s_{subscript}$, $N_{subscript}$ and of $V_{subscript}$ having a maximum variation of $\pm 5\%$, where $R_{subscript}$ is the radius of curvature of the successive surfaces from the object to the image side of the system, $N_{subscript}$ the refractive index for the $d$-line of the spectrum of the glasses of the elements in such order, $V_{subscript}$ the Abbe number of the glasses in such order, $d_{subscript}$ the axial thickness of the elements in such order, and $s_{subscript}$ the air spacings between the elements in such order.

4. A zoom lens system comprising a first component I, a second component II, a third component III, and a fourth component IV, having the following numerical values:

[Focal length F=1 to 4.4444. Aperture ratio=1:2.8. Zooming ratio Z=4.444. Available image field diameter: Over $0.96\phi$]

| Component | Radius of Curvature | Lens Thickness or Axial Spacing | Index of Refraction | Abbe Number |
|---|---|---|---|---|
| I | $R_1 = 4.6924$ | | | |
| | $R_2 = 1.7478$ | $d_1 = 0.0667$ | $N_1 = 1.6889$ | $V_1 = 31.1$ |
| | $R_3 = \infty$ | $d_2 = 0.4444$ | $N_2 = 1.6935$ | $V_2 = 53.4$ |
| | $R_4 = 3.3395$ | $s_1 = 0.0022$ | | |
| | $R_5 = 9.0175$ | $d_3 = 0.1556$ | $N_3 = 1.6204$ | $V_3 = 60.3$ |
| | | $s_2 = \begin{cases}0.0097\\1.2155\\1.7875\end{cases}$ | | |
| II | $R_6 = \infty$ | $d_4 = 0.4000$ | $N_4 = 1.6385$ | $V_4 = 55.5$ |
| | $R_7 = 2.0666$ | $s_3 = 0.0751$ | | |
| | $R_8 = \infty$ | $d_5 = 0.0400$ | $N_5 = 1.6385$ | $V_5 = 55.5$ |
| | $R_9 = 2.0666$ | $s_4 = 0.1316$ | | |
| | $R_{10} = -2.0666$ | $d_6 = 0.0267$ | $N_6 = 1.6583$ | $V_6 = 57.3$ |
| | $R_{11} = 0.6651$ | $d_7 = 0.2289$ | $N_7 = 1.6477$ | $V_7 = 33.9$ |
| | $R_{12} = -10.1419$ | | | |
| | | $s_5 = \begin{cases}1.8414\\0.3521\\0.0637\end{cases}$ | | |
| III | $R_{13} = -3.0782$ | $d_8 = 0.0444$ | $N_8 = 1.5688$ | $V_8 = 56.0$ |
| | $R_{14} = 9.6259$ | | | |
| | | $s_6 = \begin{cases}0.0889\\0.3724\\0.0889\end{cases}$ | | |
| IV | $R_{15} = 2.4029$ | $d_9 = 0.0222$ | $N_9 = 1.7283$ | $V_9 = 28.3$ |
| | $R_{16} = 0.9098$ | $d_{10} = 0.1378$ | $N_{10} = 1.6433$ | $V_{10} = 47.8$ |
| | $R_{17} = -2.4029$ | $s_7 = 0.0111$ | | |
| | $R_{18} = 0.9524$ | $d_{11} = 0.1442$ | $N_{11} = 1.6073$ | $V_{11} = 59.5$ |
| | $R_{19} = -13.4843$ | $s_8 = 0.2307$ | | |
| | $R_{20} = -1.6858$ | $d_{12} = 0.5509$ | $N_{12} = 1.6477$ | $V_{12} = 33.9$ |
| | $R_{21} = 0.7678$ | $s_9 = 0.1164$ | | |
| | $R_{22} = 1.3423$ | $d_{13} = 0.2444$ | $N_{13} = 1.6237$ | $V_{13} = 47.0$ |
| | $R_{23} = -1.3423$ | | | | where the focal length $f_1$ of the first component I=3.7987, the focal length $f_2$ of the second component II=$-1.0880$, the focal length $f_3$ of the third component III=$-4.0953$, and the reciprocal of the $R_{subscript}$ values have a maximum variation of $\pm 0.05$ each, the $d_{subscript}$, $s_{subscript}$, $N_{subscript}$ and $V_{subscript}$ values a maximum variation of $\pm 5\%$ each, the $R_{subscript}$ denoting the radii of curvature of the surfaces in the order of succession from the object side to the image side of the system, the $N_{subscript}$ the refractive indices of the $d$-line of the glass of the elements in such order, the $V_{subscript}$ the Abbe numbers of the glass of the elements in such order, the $d_{subscript}$ the axial thickness of the elements in such order, and the $s_{subscript}$ the air spacings between the elements and the components in such order.

References Cited in the file of this patent

UNITED STATES PATENTS

| 2,847,907 | Angenieux | Aug. 19, 1958 |
| 2,913,957 | Back | Nov. 24, 1959 |
| 2,937,572 | Yamaji | May 24, 1960 |

OTHER REFERENCES

"Television Zoom Lenses," Cook, Journal of the SMPTE, vol. 68, January 1959, pages 25–28.